July 28, 1953 K. SCHLESINGER 2,647,161
DOUBLE TRIODE CLAMPING CIRCUIT FOR
DIRECT CURRENT REINSERTION
Filed Sept. 17, 1947 2 Sheets-Sheet 1

Inventor
Kurt Schlesinger
By Norman L. Mueller
Atty.

July 28, 1953 K. SCHLESINGER 2,647,161

DOUBLE TRIODE CLAMPING CIRCUIT FOR DIRECT CURRENT REINSERTION

Filed Sept. 17, 1947 2 Sheets-Sheet 2

INVENTOR.
Kurt Schlesinger
BY Foorman L. Mueller
Atty.

Patented July 28, 1953

2,647,161

UNITED STATES PATENT OFFICE 2,647,161

DOUBLE TRIODE CLAMPING CIRCUIT FOR DIRECT CURRENT REINSERTION

Kurt Schlesinger, Maywood, Ill., assignor to Motorola, Inc., Chicago, Ill., a corporation of Illinois Application September 17, 1947, Serial No. 774,503

1 Claim. (Cl. 178—7.5)

This invention relates generally to a background control system for television receivers and more particularly to automatic means for controlling the black-level so that manual readjustment is not required.

In television receiver circuits, it is usual practice to use a direct current restorer to furnish the background setting or black-level of the reproduced picture. In such a system the negative peaks of the signal are fixed at zero potential and, therefore, the black-level becomes proportional to the amplitude or strength of the signal. If the background is then set to provide proper reproduction of a weak signal, a strong signal will not be properly reproduced as the black-level will actually extend in the region between black and white, and white signals will be excessive and produce blooming of the receiver tube. It is apparent from the above that to compensate for the differences in signal strength the background setting must be changed frequently and manual control becomes difficult.

It is, therefore, an object of the present invention to provide an automatic black-level or background control for use in television receivers.

It is another object of this invention to provide a black-level control which is effective to automatically adjust the background setting for each field of the reproduced picture.

It is a further object of this invention to provide a system for restoring the black-level in the receiver tube of a television receiver to the same value after each field regardless of the amplitude of the received picture signal.

A feature of this invention is the provision of a clamping circuit for setting the bias of the picture tube after each field of the transmitted picture.

A further feature of this invention is the provision of a black-level control for a television receiver in which the voltage pulses produced in the vertical sweep circuit are used to actuate the black-level control.

A still further feature of this invention is the provision of a black-level control for a television receiver in which a double triode clamping circuit is used for adjusting the bias on the picture tube at the end of each picture field.

Further objects, features and advantages will be apparent upon a consideration of the following description taken in connection with the accompanying drawings in which.

In practicing the invention, there is provided a television receiver of the superheterodyne type, which includes a circuit for deriving a video signal and applying the same to the control elements of a cathode ray receiver tube, and means for deriving synchronization signals and using the same for controlling magnetic fields for deflecting the electron beam of the cathode ray tube. A clamping circuit is provided for establishing the bias of the tube at a predetermined value when signals corresponding to black are applied thereto. This clamping circuit comprises a double triode which is arranged to establish the bias on the picture tube between successive picture fields. Although the clamping circuit may be arranged to provide any desired potential on the grid of the cathode ray tube to correspond to a black signal, I prefer to bring the grid to zero potential to correspond to black.

Figure 1:
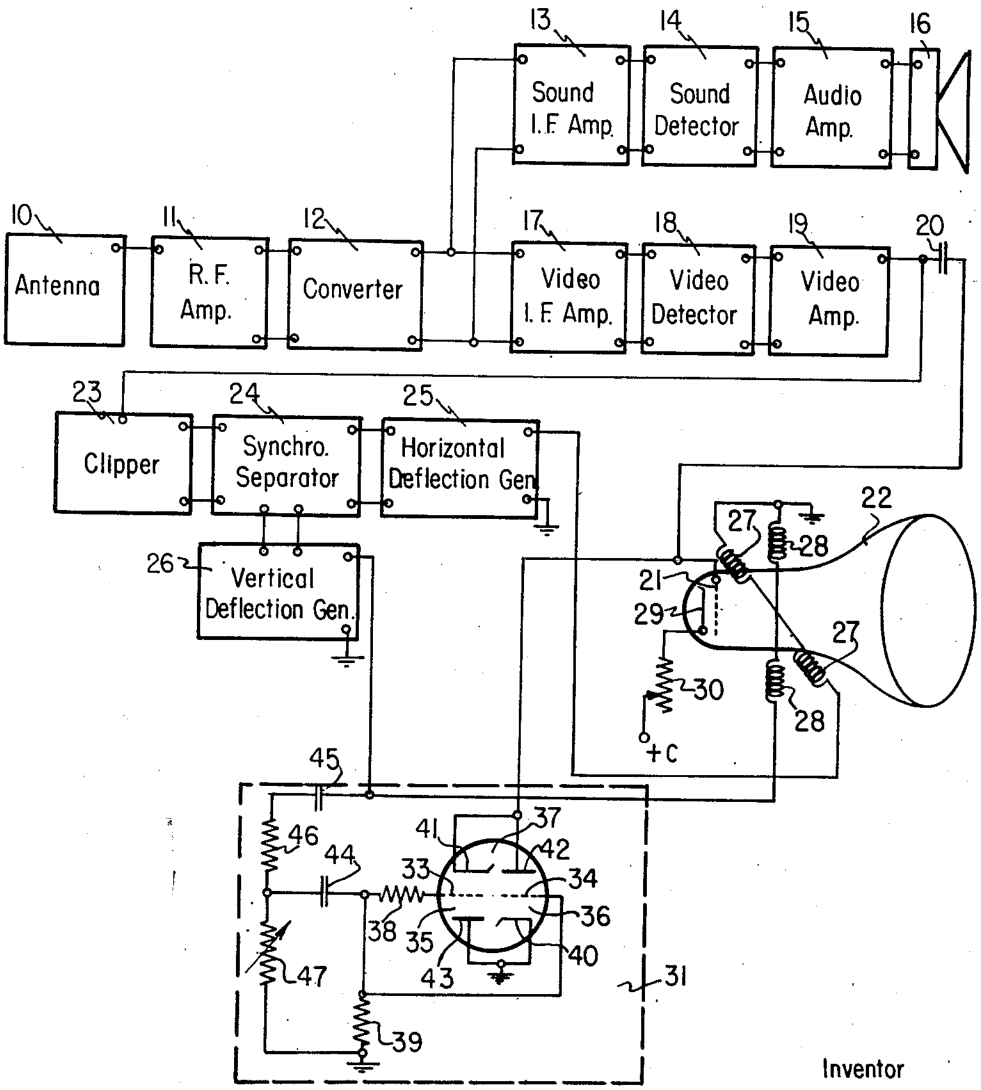
Fig. 1 illustrates a television receiver embodying the black-level control in accordance with the invention.

Referring now more particularly to the drawings, in Fig. 1 there is illustrated a television receiver of the superheterodyne type embodying the black-level control in accordance with the invention. The receiver includes an antenna system 10 adapted to intercept radio frequency signals and apply them to a radio frequency amplifier 11 wherein the signals are selected and amplified. The amplified radio frequency signals are applied to converter 12 which reduces the frequency and applies the signals to sound intermediate frequency amplifier 13 and video intermediate frequency amplifier 17. The sound signals are selected and amplified in the intermediate frequency amplifier 13 and applied to detector 14 wherein signals of audio frequency are derived.

The audio signals are amplified in audio amplifier 15 and reproduced in sound reproducing device 16 in a well known manner.

The video intermediate frequency signals are selected and amplified in video intermediate frequency amplifier 17 and are then applied to video detector wherein demodulated video signals are obtained. The demodulated signals are amplified by video amplifier 19 and applied through condenser 20 to the control grid 21 of the television picture tube 22. For obtaining synchronization pulses from the composite video signal, clipper 23 is provided which supplies the clipped signals to synchronization signal separator 24. The synchronization signal separator 24 separates the horizontal and vertical synchronization pulses, applying the horizontal pulses to horizontal deflection generator 25, and the vertical synchronization pulses to vertical deflection generator 26. For deflecting the electron beam produced by the picture tube 22, the tube includes horizontal deflecting coils 27 and vertical deflecting coils 28. The horizontal coils 27 are energized by horizontal deflection generator 25, and the vertical deflection coils are energized by vertical deflection generator 26. As the deflection generators are held in synchronization with the pulses derived from the video signal, the electron beam will scan the screen of the picture tube in such a manner as to reconstruct the transmitted picture.

As previously stated, the video signal is applied to the grid 21 of the picture tube 22. The cathode 29 of the tube is held at a positive value which may be adjusted by the variable resistor 30 which connects the cathode to a source of positive potential marked plus C. The grid 21 is connected to a clamping circuit illustrated generally as 31 which is arranged to connect the grid to ground potential between successive fields of the television picture as will be explained in detail.

Figure 2:
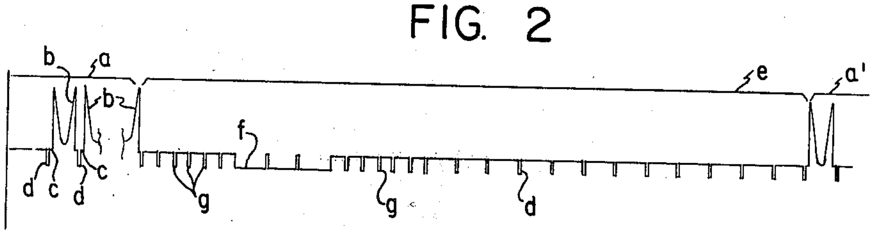
Fig. 2 illustrates a standard television video signal.

For a complete understanding of the purpose of the clamping circuit, reference is made to Fig. 2 which illustrates the usual television video signal. As is apparent in Fig. 2, the signal includes a portion *a* including a plurality of picture elements *b* representing lines in the television picture. The picture elements *b* are separated by pedestals *c* which are at the reference or black-level value. On each pedestal is a horizontal synchronizing pulse *d* which extends in the direction beyond the black-level. After the last line in each field there is a blanking period indicated as *e* during which vertical synchronizing pulses *f* and equalization pulses *g* are provided in the composite video signal. This period also includes a plurality of line synchronizing pulses *d* before the next group of picture elements *a'* is included. In the standard television signal the period between successive lines (between picture elements *b*) is approximately 4 microseconds and the blanking period between successive fields (*e*) is approximately 1¼ milliseconds.

Figure 3:
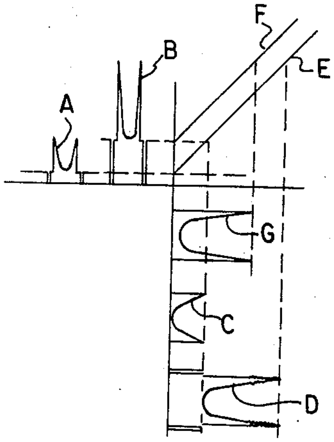
Fig. 3 illustrates the usual action of the receiver tube causing variations in the black-level.
Figure 4:
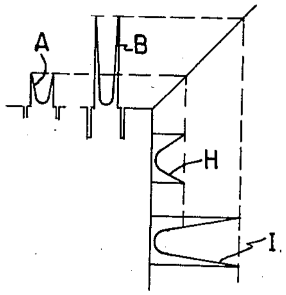
Fig. 4 illustrates the improved black-level control produced by the system in accordance with the invention.

In Fig. 3 there is illustrated the objectionable change in black-level normally encountered due to change in amplitude of the received signal, and in Fig. 4 is illustrated the results obtained by the automatic adjustment of the black-level by the system in accordance with the invention. Fig. 3 illustrates picture elements A and B which are portions of relatively weak and relatively strong signals respectively. It is to be pointed out that signals A and B would not occur at adjacent picture elements in a signal but would be elements spaced apart by a period of time. When the background control of the television receiver, that is, the bias on the picture tube is adjusted to provide a proper brightness for a signal of the strength of picture element A, the brightness of the screen corresponding to this picture element is indicated by the curve C. Now, it will be noted that if the background control is maintained at the same level the picture element B will produce brightness as indicated by the curve D. It is apparent from Fig. 3 that the synchronizing signals adjacent picture element D are not now in the black region but are of such intensity as to appear within the picture. Also, the high points on the brightness curve D are of excessive amplitude and may cause the tube to bloom. In order to compensate for this the background control must be changed so that the black-level for the strong signal again corresponds to the reference value. This is accomplished by changing the background control from E to F so that the signal B produces a brightness as indicated by the curve G instead of that indicated by curve D. In curve G, the black-level is at the same reference as the black-level of the curve C, and the bright portions of the picture element are within the amplitude range of the picture tube. It now becomes apparent that for proper reproduction of the signals A and B without change of the background control, the signals must be adjusted so that the black-level of the two signals are established at the same reference point. This is illustrated by the picture elements A and B in Fig. 4. When this condition exists, the brightness produced by the signals as indicated by curves H and I, respectively, are oriented so that black in both signals is at the same reference.

Figure 5:
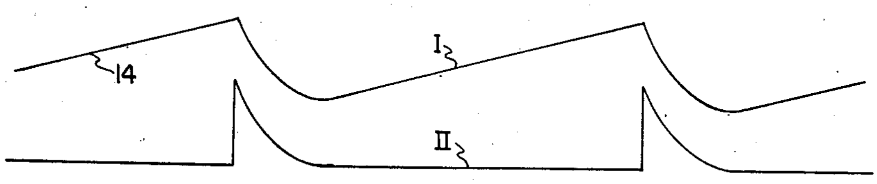
Fig. 5 illustrates the voltage kick appearing in the vertical deflection coils of a television receiver at the end of each field.

Referring again to Fig. 2, it is noted that the signal remains at the black-level (with synchronizing pulses thereon) for a relatively long period between fields. This provides ample time for the bias of the picture tube to be adjusted to a reference level which corresponds to the black-level of the picture and which can be adjusted at the end of each field so that the black level does not change with the amplitude of the signal. The manner in which the clamping circuit 31 in Fig. 1 produces this function will now be explained. As previously stated, the clamping circuit 31 in Fig. 1 is arranged to connect the grid 21 of the picture tube to ground between successive fields of the picture when the signal corresponding to the black-level is being applied to the grid. This is accomplished by coupling the clamping circuit 31 to the vertical deflecting coils 28 of the picture tube. As is well known, a sawtooth current is developed in the deflecting coils to cause the beam to slowly trace and rapidly retrace the screen. Such a current wave is illustrated by curve I of Fig. 5. As the current in the coils drops suddenly during the retrace period a voltage pulse is produced therein which is utilized for controlling the clamping circuit 31. This voltage pulse is normally too large for direct application to the tubes of the clamping circuit and, therefore, is applied to condenser 45 and resistors 46 and 47 which form a voltage divider. Condenser 45 and resistor 46 have a time constant so that the pulse will be applied to the clamping circuit only during the vertical blanking period. Curve II in Fig. 5 illustrates the pulse applied through coupling condenser 44 to the grids 33 and 34 of the triode sections 35 and 36 of the double triode tube 37. Connection is made to grid 33 through resistor 38 and both grids are biased by resistor 39.

As the pulse produced in the deflecting coils 28 is positive and the cathode 40 of the triode section 36 is at ground potential, grid current will flow through the triode section 36. This will charge condenser 44 and thereby reduce the potential on the grids 33 and 34. When the voltage pulse passes, the grids 33 and 34 will be held negative by the condenser 44 so that the triode sections 35 and 36 will be blocked and cannot conduct. At the end of the next field the voltage pulse will cause the grids 33 and 34 to become positive and the triode sections will again become conducting.

As seen from the above, the triode sections 35 and 36 are conducting only for a brief period between fields. As the two triode sections are connected in parallel opposing relation with the cathode 41 of section 35 and the plate 42 of section 36 connected to the grid 21 and the plate 43 of section 35 and cathode 40 of section 36 connected to ground, current can flow in either direction as required to bring the grid 21 to ground potential. When the grid 21 is thus grounded, the signal representing the black-level is applied thereto through condenser 20. Grounding of the grid 21 causes current to flow in the direction required to charge condenser 20 to compensate for changes in the amplitude of the signal representing the black-level. The speed at which the condenser 20 becomes charged depends, of course, on the value of the condenser and the internal resistance of the tube 37. However, this action can be made fast enough to provide satisfactory results. The bias provided on the grid 21 by the clamping action will hold for the duration of a field as there is no leakage across the grid and the condenser 20 may be quite large. It has been found that a condenser of .05 microfarad or larger should be used for best results. The resistor 38 is provided to prevent loading of negative pulses by grid current when the triode section 35 conducts during clamping. Therefore, the clamping circuit is effective to adjust the black-level at the end of each field to compensate for changes in amplitude of the signal and holds the bias at the same level through the succeeding line until the level is again reset.

Although the clamping circuit is illustrated as coupled to the deflection coils of the receiver to be actuated by the pulses produced therein, it is obvious that the keying pulse can be generated in other ways. The operation of the clamping circuit does not depend on the amplitude of the keying pulse and might be actuated by the vertical synchronization signal. The keying pulse must, however, be of greater amplitude than the maximum signal amplitude so that the grids of the triode sections of the tube can be held sufficiently negative that the triodes will not conduct in response to the video signal applied thereto.

The clamping circuit as disclosed, in addition to providing black-level control, also serves to protect the cathode ray tube from damage due to failure of the vertical deflection generator. The triode tubes in the clamping circuit are adapted to connect the grid of the cathode ray tube to ground. When the circuit is actuated by the vertical pulse, the triodes are biased off and allow the grid to follow the video signal. However, if the vertical deflection generator fails, the pulses will not be present and the triodes will function as a leakage resistor to ground and extinguish the beam of the cathode ray tube. This prevents damage to the screen caused by the beam striking a limited area thereof.

It is apparent from the above that the clamping circuit as described provides effective black-level control in the television receiver. The clamping circuit adjusts the bias of the receiver tube at the end of each field so that the black-level is independent of the amplitude of the signal. It is apparent that various other clamping circuits can be used instead of the double triode tube illustrated. For example, a double diode tube can be used in a well known clamping circuit. The clamping circuits may also be arranged to hold the grid of the picture tube to a value other than zero by connecting the two sections of the clamping tube in series across a voltage so that they act as a voltage divider. In such a system the grid may be connected between the sections to thereby be held at a fixed potential instead of being restored to ground.

Although I have described one embodiment of my invention which is illustrative thereof, it is apparent that various changes and modifications can be made therein without departing from the intended scope of the invention as defined in the appended claim.

I claim:

In a television receiver adapted to produce a picture from a composite video signal including picture elements representing various light intensities, and line and field synchronization signals superimposed on a reference level corresponding to a black picture interspersed with said picture elements, which receiver includes a cathode ray tube having means for producing an electron beam and a grid for controlling the intensity thereof, and a vertical deflecting circuit synchronized with said field synchronization signals for deflecting said beam; means for establishing a bias on said grid of said cathode ray tube so that the intensity of said beam for signals of said reference level is fixed independently of the strength of said video signal including in combination, first condenser means connected to said grid for applying said video signal thereto, a clamping circuit coupled to said grid and to a point of zero potential and rendered conducting when a voltage pulse is applied thereto, said clamping circuit including first and second triode valves having cathode, anode and grid electrodes, said cathode of said first valve and said anode of said second valve being connected to said cathode ray tube grid, said anode of said first valve and said cathode of said second valve being connected to said point of zero potential, and a coupling circuit connected to said vertical deflecting circuit and to said clamping circuit for applying the voltage pulse produced in said vertical deflection circuit to said clamping circuit each time said field synchronization signal is applied to said cathode ray tube grid, said coupling circuit including voltage divider means, coupling condenser means connecting said voltage divider means to said vertical deflection circuit for applying the voltage pulse thereto, biassing resistor means connected between said grids of said triode valves and zero potential, and second coupling condenser means connecting said voltage divider means to said grids of said valves for applying a portion of said voltage pulse from said vertical deflection circuit thereto to cause said valves to conduct and thereby connect said cathode ray tube grid to said point of zero potential, so that the voltage across said first condenser means is adjusted to provide the voltage required to hold said grid at said zero potential, said second condenser means being effective to block said triode valves at the end of each voltage pulse.

KURT SCHLESINGER.

References Cited in the file of this patent

UNITED STATES PATENTS

| Number | Name | Date |
|---|---|---|
| 2,190,753 | Browne et al. | Feb. 20, 1940 |
| 2,197,900 | Schlesinger | Apr. 23, 1940 |
| 2,240,136 | Geiger | Apr. 29, 1941 |
| 2,240,281 | Ballard | Apr. 29, 1941 |
| 2,254,114 | Wilson | Aug. 26, 1941 |
| 2,259,538 | Wheeler | Oct. 21, 1941 |
| 2,299,945 | Wendt | Oct. 27, 1942 |
| 2,307,375 | Blumlein et al. | Jan. 5, 1943 |
| 2,335,265 | Dodington | Nov. 30, 1943 |
| 2,436,890 | Higinbotham | Mar. 2, 1948 |
| 2,438,947 | Rieke et al. | Apr. 6, 1948 |
| 2,467,486 | Krumhansl et al. | Apr. 19, 1949 |
| 2,525,106 | Wendt | Oct. 10, 1950 |
| 2,543,037 | Mayle | Feb. 27, 1951 |

FOREIGN PATENTS

| Number | Country | Date |
|---|---|---|
| 845,897 | France | Sept. 4, 1939 |